April 25, 1939.　　A. O. WILLIAMS　　2,156,006
BRAKE
Filed June 2, 1938　　2 Sheets-Sheet 1
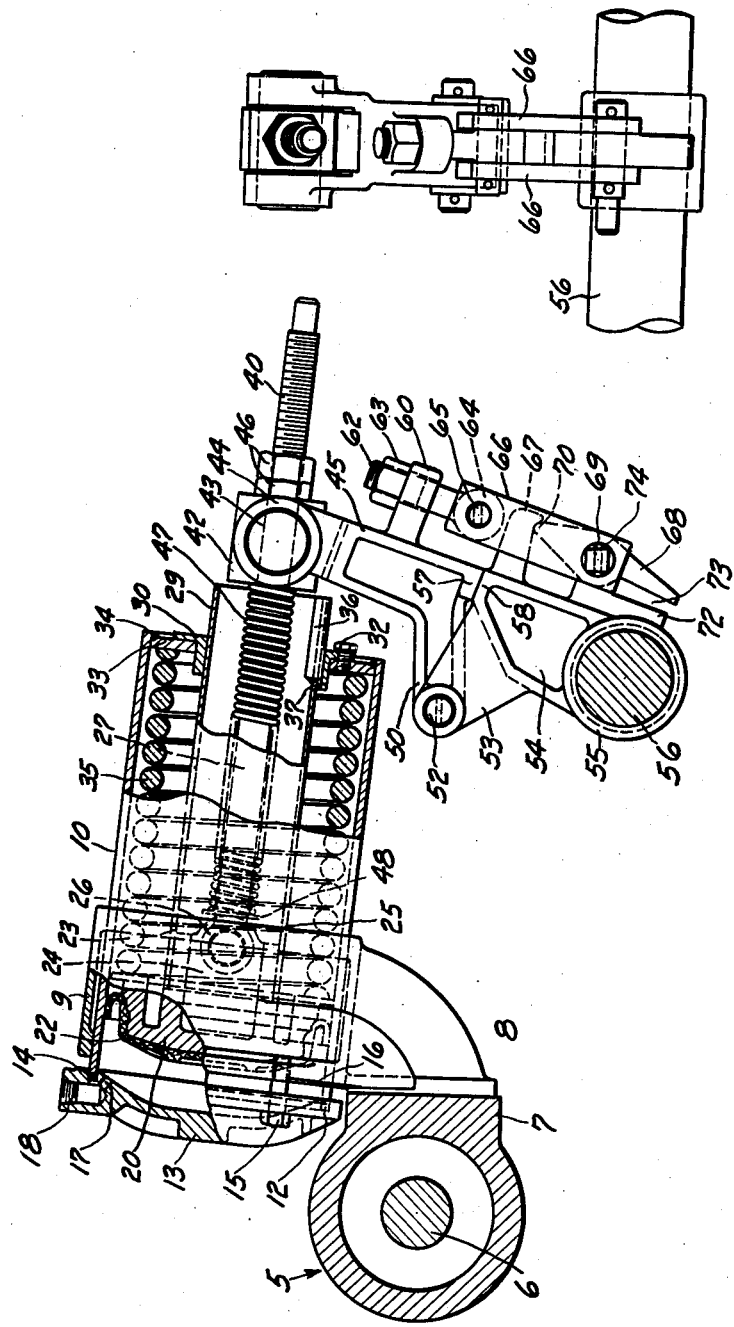
INVENTOR.
ALFRED O. WILLIAMS.
BY Walter E. Schirmer
ATTORNEY.

April 25, 1939. A. O. WILLIAMS 2,156,006
BRAKE
Filed June 2, 1938 2 Sheets-Sheet 2

INVENTOR.
ALFRED O. WILLIAMS.
BY Walter E. Schirmer
ATTORNEY.

Patented Apr. 25, 1939

2,156,006

UNITED STATES PATENT OFFICE 2,156,006

BRAKE

Alfred O. Williams, Battle Creek, Mich., assignor to Clark Equipment Company, Battle Creek, Mich., a corporation of Michigan Application June 2, 1938, Serial No. 211,418

12 Claims. (Cl. 188—170)

This invention relates to brakes and braking systems, and is particularly concerned with the provision of a braking system for use in street cars, rail cars and other rail vehicles employing shoe type brakes engageable with the tread of the car wheels.

In the majority of rail vehicles of this general type now in use it has been customary to provide a transversely extending brake beam or brake rod which, at opposite ends, carries suitable brake heads supporting brake shoes toward or away from the tread surface of the car wheels. In most cases such brakes are applied by means of air under pressure directed against a piston which is suitably connected to a crank arm or other mechanism for rotating the shaft with spring means operable to return the brake shaft to brake-released position upon release of the air pressure in the brake cylinder.

However, with such types of braking mechanism it is apparent that if there should be an accidental leak in the pressure line, or the air compressor in the vehicle should fail to function properly, there would be no means for applying the brakes and consequently the car would be without any braking means other than perhaps the braking effect of the motor or the like. This may result in serious danger due to the fact that the operator is not apprized of the defects in the braking system, and consequently accidents may result due to failure of the brakes to function properly.

The present invention is concerned particularly with the provision of a braking system which is automatically operable upon a defect in the air pressure system for setting the car brakes and thereby stopping the car, thus preventing any possibility of accident and at the same time apprizing the operator of the defective condition of the brakes.

One of the primary objects of the present invention is to provide a braking system of this type, which operates to rock the brake arm or brake rod into brake engaging position upon a decrease in the air pressure system. This mechanism is so constructed that it will result in positive setting of the brakes upon such leakage in pressure, and will maintain the brakes set until the operator manually releases the mechanism to allow the car to be towed or moved to the desired repair station.

Another feature of the present invention is the provision of a suitable latching means which is normally positioned so as to provide a rigid crank arm between the brake actuating mechanism and the brake beam, but which is manually releasable to permit a release of the brake beam so that it will return to brake-released position upon suitable manual operation.

Another feature of the present invention resides in the provision of a negative braking system of this type which is composed of relatively few parts, and which is capable of easy assembly and mounting upon car trucks and is mechanically actuated by spring means or the like entirely independently of any control on the part of the operator, and responsive solely to decreases in pressure in the pressure braking system.

In the preferred form of the present invention I preferably employ an actuating cylinder and piston construction in which air pressure on the piston within the cylinder normally holds the brake control mechanism in inoperative position, but any decrease in such pressure results in the piston being moved toward brake applying position by means of a relatively heavy spring carried within the cylinder.

The cylinder construction itself is of rugged design, and is so arranged as to be supported upon the axle housing of the truck extending longitudinally of the truck to a point above the brake beam. Preferably, the piston rod has a universal connection in the piston head to accommodate the arcuate swinging movement of the crank arm on the brake beam as it moves from brake applying to brake releasing position.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 1 is a side elevational view partly in section of one form of the present invention;

Figure 2 is an end elevational view of the connection between the cylinder and the brake beam shown in Figure 1.

Figure 3:
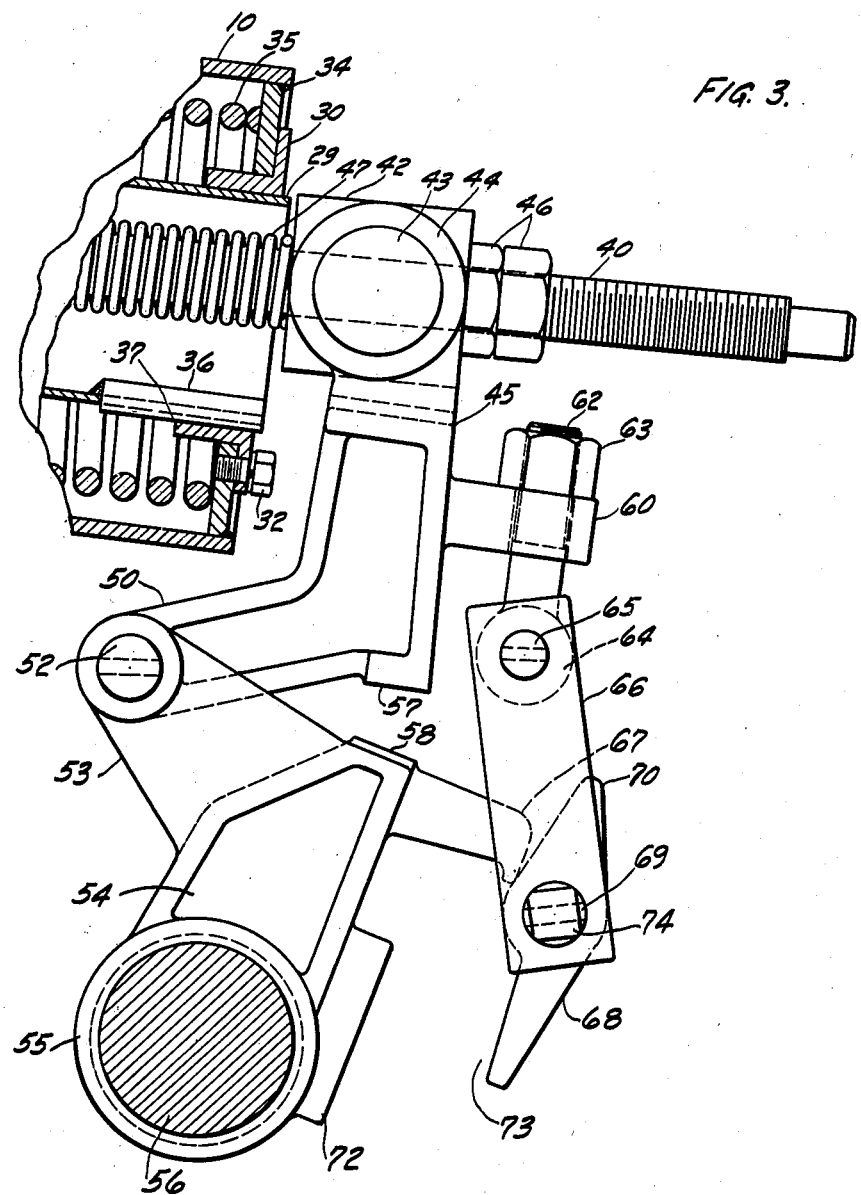
Figure 3 is an enlarged side elevational view of the portion of the mechanism shown in Figure 2.

Considering now the drawings in detail, an axle housing is indicated generally at 5 and has the axle shaft 6 extending therethrough in the usual manner. The housing 5 is provided with a boss portion 7 forming a bolting face to which is secured the bracket 8 having the cylindrical sleeve portion 9 adapted to receive the cylinder sleeve 10, which may be welded or otherwise rigidly secured therein.

The cylinder sleeve 10 at its upper end is adapted to extend into an annular recess 12 formed in the cylinder head 13, and is sealed with respect thereto by means of the lead gasket 14. The cylinder head 13 is suitably bolted as indicated by the bolts 15 to a flange 16 on the bracket, and the lead gasket is thereby compressed to seal the cylinder head 13 to the cylinder sleeve 10. A suitable fluid inlet port is provided in the head 13, as indicated at 17, and is connected through the tapped opening 18 to any suitable source of pressure supply, such as a compressor or the like carried by the car to which the truck is secured.

The truck itself may be of the general type shown in the copending application of Robert J. Burrows and myself, Serial No. D-74,505, filed January 24, 1938, although it may be equally well applied to any type of truck.

Disposed within the sleeve 10 is a piston head 20 having a suitable leather or rubber sealing member 22 secured over the head end thereof, and forming a tight seal with the internal wall of the sleeve 10. The piston head 20 is provided with the central journal portion 23 within which is mounted a cross beam member 24 having the suitable normally extending journal portion 25 to which is connected the sleeve end 26 of a piston rod 27. The rod 27 therefore has substantially universal support within the head 20, and is preferably enclosed within a second sleeve 29 which is secured to the head of the piston and which extends axially of the sleeve 10, and is guided for reciprocation conjointly with the head by means of the bushing 30 bolted, as indicated at 32, to the end plate 33 which is secured within the outer end of the cylinder sleeve 10 as by means of the annular weld 34.

Biased between the end plate 33 and the base of the piston head 20 is a relatively heavy coiled spring 35 which normally urges the piston head 20 to its full inner position, thereby tending to draw the rod 27 inwardly of the sleeve 10. Preferably, the sleeve 29 is provided with a key member 36 which slides in a suitable keyway 37 formed in the bushing 30 to prevent rotation of the sleeve 29 relative to the cylinder 10, thereby preventing rotation of the head 20 within the cylinder sleeve which would produce undue friction and possibly result in binding on the spring 35.

The outer end of the rod 27 is threaded, as indicated at 40, and has mounted thereon a sliding block 42 having a sleeve member 43 extending therethrough upon which is pivotally mounted the yoke portion 44 of the arm 45. The block 42 is held in position longitudinally of the rod 27 by means of the nuts 46 and the spring 47 encircling the rod and biased at one end against the washer 48 and at the opposite end against the block 42. The spring 47 prevents the block 42 from moving inwardly with respect to the rod 27, while the nuts 46 serve as positive abutments for the block 42 to move the arm 45 conjointly with inward movement of the rod 27 under influence of spring 35.

The arm 45 is provided with a forwardly extending tongue portion 50 which is adapted to receive a pivot pin 52 forming a pivot for the bifurcated ends 53 of a second arm 54 having the sleeve portion 55 welded or otherwise suitably secured to the brake beam or brake rod 56. It will thus be seen that the arms 45 and 54 are connected by the pin 52 for relative pivotal movement, and that the arm 54 in turn is connected to the transversely extending rod 56 whereby any movement of the arm 54 caused by its connection with the arm 45 will result in rotational movement of the rod 56.

The arms 45 and 54 are provided with coacting abutments 57 and 58, respectively, which are adapted to engage together to provide for limiting relative rotational movement of the two arms, and thereby forming the two arms into a single strut or crank member connected between the rod 56 and the piston rod 27. It will be apparent that an inward thrust caused by spring 35 on the piston and which tends to rotate the two arms 45 and 54 in a counter-clockwise direction about the center of rod 56 will have a tendency to break the abutting engagement at the point 57—58 and cause the two arms to rotate with respect to each other about the pin 52.

In order to lock the two arms together, a suitable toggle locking mechanism is provided which comprises a rearwardly extending boss 60 on the arm 45 adapted to carry the pin 62 which is held thereon by means of the nut 63, and which has a suitable eye portion 64 adapted to receive a cross pin 65. Connected to the cross pin 65 is a pair of links 66 as shown more clearly in Figures 2 and 3, which extend downwardly on opposite sides of the hook portion 67 formed as a rearward extension adjacent the top of the arm 54. Pivotally mounted between the links at the lower ends thereof is a toggle control member 68 mounted on the cross pin 69 and having a cam portion 70 adapted to engage under the hooked end of the portion 67 of the arm 54 to thereby force the links 66 against a rearwardly projecting boss 72 on the arm 54.

With this construction it will be apparent that the pins 65 and 69 connected by the links 66 form with the cam engagement indicated at 70 a toggle construction which, in normally latched position, is over center, the point of camming engagement of the member 68 with the hooked portion 67 lying outwardly of a line between the pins 65 and 69. This provides for latching the arms 45 and 54 together against possible relative movement about the pin 52 so that the two arms in effect constitute but a single crank connected between the piston and the transverse brake beam.

In the operation of the mechanism thus far described, under normal operation, the cylinder head above the piston 20 is preferably filled with air or other fluid under pressure, such as to force the piston outwardly of the sleeve 10 to thereby compress the spring 35 and thus hold the connection arms 45 and 54 in brake releasing position due to the spring 47 abutting against the block 42. Upon normal actuation of the brakes by the control means, the transverse rod 56 will be rotated slightly in a counter-clockwise direction by forward movement of the block 42 under influence of spring 35, and will also cause a slight raising of rod 27 about its pivot 26 within the sleeve 29. The control means will release the braking system by admitting pressure to cylinder 10, compressing spring 35 to thereby restore the mechanism to the position shown in Figure 1.

However, if any leaks should develop in the braking system or if the pressure system should fail to hold pressure, the pressure within the cylinder sleeve 10 above the piston will decrease, and consequently the piston 20 will move inwardly of the sleeve 10 under the influence of spring 35. This results in conjoint inward movement of the sleeve 29 and the piston rod 27, and the nuts 46 will thereby be drawn to the left as shown in Figure 1 moving the block 42 to the left, and inasmuch as the arms 45 and 54 are locked together, will cause rotation of the rod 56 to move the brake shoes carried thereby into pressure engagement with the tread of the wheels. This locks the car against movement and immediately apprizes the operator that the braking system has become defective, and at the same time prevents movement of the car which might result in accident or serious danger to the occupants of the car due to a faulty brake system.

However, it is not desirable that the car remain in stopped position upon the tracks until suitable repairs can be made to the pressure braking system, and for that reason, I have provided releasing mechanism for the emergency brakes which can be manually actuated by the operator in order that the car may be towed to a suitable repair station or the like. In the form of the invention shown, this comprises the toggle locking means which may be manually released by the operator by inserting a suitable crowbar or the like in the space 73 between the lower end of the cam member 68 and the boss 72 and prying the cam member outwardly away from the boss to thereby move the cam point 70 into alinement between the pins 69 and 65 resulting in the toggle joint being broken and the links 66 swinging free into the position shown in Figure 3. When this occurs, the hooked portion 67 of the arm 64 is released, and inasmuch as the spring pressure on the arm 56 is normally tending to rotate this arm in a clockwise direction, the two arms will spread apart by pivotal movement about the pin 52 into the position shown in Figure 3 thereby allowing the arm 56 to rotate back to brake-released position, while the arm 45 is still maintained in the position to which it has been actuated by the spring 35 and will remain in such position until the cylinder 10 is again under pressure.

When the pressure is again admitted to the cylinder 10, the piston 20 moves outwardly moving the arm 45 outwardly and bringing the abutments 57 and 58 toward each other. The cam point 70 may then be placed under the hook 57 and the lower end of the cam member 68 swung around to reset the toggle mechanism for locking the arms 45 and 54 against relative movement. The mechanism is then reset in position to be automatically operated upon a defect in the air pressure braking system to again set the brakes to prevent operation of the car until such time as they are manually released.

If desired, the pin 69 may have an extension which is squared in section as indicated at 74, and a suitable socket wrench or the like may be engaged with this squared end of the pin to rotate the cam 70 for releasing the toggle connection to allow the brakes to return to released position.

It is therefore believed apparent that I have provided a novel type of braking mechanism which will automatically set the brakes of the car whenever a defect occurs in the conventional pressure braking system. Also, the mechanism is capable of release by the operator to allow the car to be towed to a repair station and upon repair of the braking system, the system may be reset for automatic operation by re-engagement of the toggle mechanism.

I am aware that a number of changes may be made in the details of the construction and assembly of the parts herein disclosed in the illustrated embodiment of the invention, and I therefore do not intend to be limited to the particular details shown and described, but only insofar as may be defined by the scope and spirit of the appended claims.

I claim:

1. The combination, with a brake beam adapted to carry shoe brakes, of an arm secured to said beam, a second arm pivotally secured to said first arm and having abutting engagement therewith limiting rotation in one direction, toggle locking mechanism locking said arms against rotation in the opposite direction, pressure means normally holding said arms in brake releasing position, and spring means operative upon release of said pressure means for rotating said arms conjointly into brake applying position, said toggle mechanism being manually releasable to unlock said arms for relative rotation effecting release of said brakes.

2. In combination, a brake beam, an arm rigidly connected thereto, a second arm pivotally connected to said first arm, toggle means locking said arms against relative movement, a piston rod connected to said second arm, a cylinder for said rod, spring means in said cylinder normally urging said rod toward brake-applying position and held retracted by air pressure, and manually operable means for releasing said toggle means to unlock said arms for allowing said brake beam to move to brake-releasing position independently of said piston rod.

3. In combination, a brake beam, an arm rigidly connected thereto, a second arm pivotally supported on said first arm, said arms having cooperating abutments preventing pivotal movement in one direction, a pair of links carried by one of said arms, a cam extension carried by the other arm, a cam lever carried by said links and engaging said extension for locking said two arms against relative movement in the opposite direction, and means connected to said second arm for actuating the same to rotate said beam.

4. The combination, in a rail truck of an axle housing having a bracket thereon, a cylinder supported in said bracket, a piston in said cylinder having an extending piston rod, spring means in said cylinder normally urging said piston toward the head end thereof, a jointed brake arm connected to said piston rod, and manually releasable toggle means for locking said arm as a rigid lever.

5. The combination, in a rail truck, of an air cylinder having a piston therein, a sleeve in said cylinder connected to said piston, a spring encircling said sleeve within said cylinder and normally urging said piston toward its inner limiting position, a piston rod connected to the piston and extending outwardly through said sleeve, a jointed brake lever connected to said rod, and toggle means for latching the joint in said lever to hold said lever rigid.

6. The combination, in a rail truck, of an air cylinder having a piston therein, a sleeve in said cylinder connected to said piston, a spring encircling said sleeve within said cylinder and normally urging said piston toward its inner limiting position, a piston rod connected to the piston and extending outwardly through said sleeve, a pair of brake lever arms pivotally connected together, one of said arms being connected to said rod, and toggle means for latching said arms to prevent relative movement therebetween.

7. In combination, in a rail truck having a transverse brake beam, normally extending jointed brake lever means secured to said beam, a brake cylinder having a piston connected to the free end of said lever means, and manually releasable toggle means for latching said lever means to form a rigid arm.

8. The combination of claim 7 wherein said piston is normally urged toward brake applying position in said cylinder and is held in brake released position by fluid under pressure.

9. In combination, in a rail truck having an axle housing, a brake cylinder supported on and extending normally thereto, a brake beam extending parallel to the axle and having a jointed brake lever projecting therefrom substantially normal to said cylinder, a piston in said cylinder normally urged toward brake applying position and connected to said lever, and toggle means for releasing the joint in said lever to release the brake beam independently of movement of said piston.

10. In combination in a rail truck having an axle housing, a brake cylinder supported on and extending normally thereto, a brake beam extending parallel to the axle and having a jointed brake lever projecting therefrom substantially normal to said cylinder, a piston in said cylinder normally urged toward brake applying position and held in brake released position by air pressure, said piston having a rod adjustably connected to said lever, and manually releasable toggle means for maintaining the joint in said lever against collapse.

11. Brake lever means for a rail truck connected between a brake actuating piston rod and a brake beam, comprising a pair of arms, one connected to the rod and the other to the beam, a pivotal connection between said arms, and toggle means normally latching said arms together for conjoint movement as a rigid lever.

12. In a rail truck having a brake beam and a brake actuating piston, lever means therebetween comprising a pair of arms jointed together and having cooperating abutments limiting relative movement of the arms in one direction, and toggle means latched between said arms adjacent said abutments for preventing separation thereof to prevent relative movement of said arms in the opposite direction.

ALFRED O. WILLIAMS.